(12) United States Patent
Williams

(10) Patent No.: US 11,889,611 B2
(45) Date of Patent: Jan. 30, 2024

(54) PLASMA ARC TORCH AND CUTTING SYSTEM

(71) Applicant: Lincoln Global, Inc., Santa Fe Springs, CA (US)

(72) Inventor: Christopher J. Williams, Norham (GB)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 364 days.

(21) Appl. No.: 17/121,901

(22) Filed: Dec. 15, 2020

(65) Prior Publication Data

US 2022/0192001 A1  Jun. 16, 2022

(51) Int. Cl.
| | |
|---|---|
| H05H 1/34 | (2006.01) |
| B23K 9/29 | (2006.01) |
| B23K 10/00 | (2006.01) |

(52) U.S. Cl.
CPC ............... H05H 1/34 (2013.01); B23K 9/291 (2013.01); B23K 10/00 (2013.01); H05H 1/3457 (2021.05); H05H 1/3478 (2021.05)

(58) Field of Classification Search
CPC .......... B23K 9/291; B23K 10/00; H05H 1/34; H05H 1/3457; H05H 1/3478
See application file for complete search history.

(56) References Cited

U.S. PATENT DOCUMENTS

| | | | |
|---|---|---|---|
| 4,527,037 A | 7/1985 | Johnson et al. | |
| 4,816,637 A | 3/1989 | Sanders et al. | |
| 5,194,715 A * | 3/1993 | Severance, Jr. | H05H 1/34 219/121.48 |
| 5,856,647 A * | 1/1999 | Luo | B23K 10/00 219/121.48 |
| 5,906,758 A * | 5/1999 | Severance, Jr. | H05H 1/34 219/121.49 |
| 6,268,583 B1 | 7/2001 | Yamaguchi et al. | |
| 6,777,641 B2 | 8/2004 | Cole, III et al. | |
| 7,067,762 B2 | 6/2006 | Yamaguchi et al. | |
| 8,809,728 B2 | 8/2014 | Brandt et al. | |
| 2014/0008332 A1 | 1/2014 | Ogborn et al. | |

FOREIGN PATENT DOCUMENTS

| | | |
|---|---|---|
| WO | 2010073223 A1 | 7/2010 |
| WO | 2017201138 A1 | 11/2017 |

OTHER PUBLICATIONS

Extended European Search Report from Corresponding Application No. 21214504.9; dated May 18, 2022; pp. 1-8.
Esab; "Plasmarc™ Standard / XR Series Air Curtain Kit;" Instruction Manual; Dated Feb. 2012; pp. 1-32.
Hypertherm; "Making better holes with plasma;" https://www.hypertherm.com/en-US/learn/spark-the-blog/making-better-holes-with-plasma/; Spark the blog; Dated Jul. 22, 2014; pp. 1-3.

* cited by examiner

Primary Examiner — Brian W Jennison
(74) Attorney, Agent, or Firm — Brad C. Spencer

(57) ABSTRACT

A plasma arc torch includes a nozzle body, a nozzle extending from the nozzle body, and a shield cap. An outer retaining cap is attached to the plasma arc torch and secures the shield cap to the plasma arc torch. A sleeve is located radially outward from the outer retaining cap and is configured to receive a flow of pressurized gas. An insulator is located between the outer retaining cap and the sleeve. At least one of the sleeve and the insulator forms a gas flow channel configured to direct a gas flow from the sleeve to a distal portion of the outer retaining cap.

24 Claims, 10 Drawing Sheets

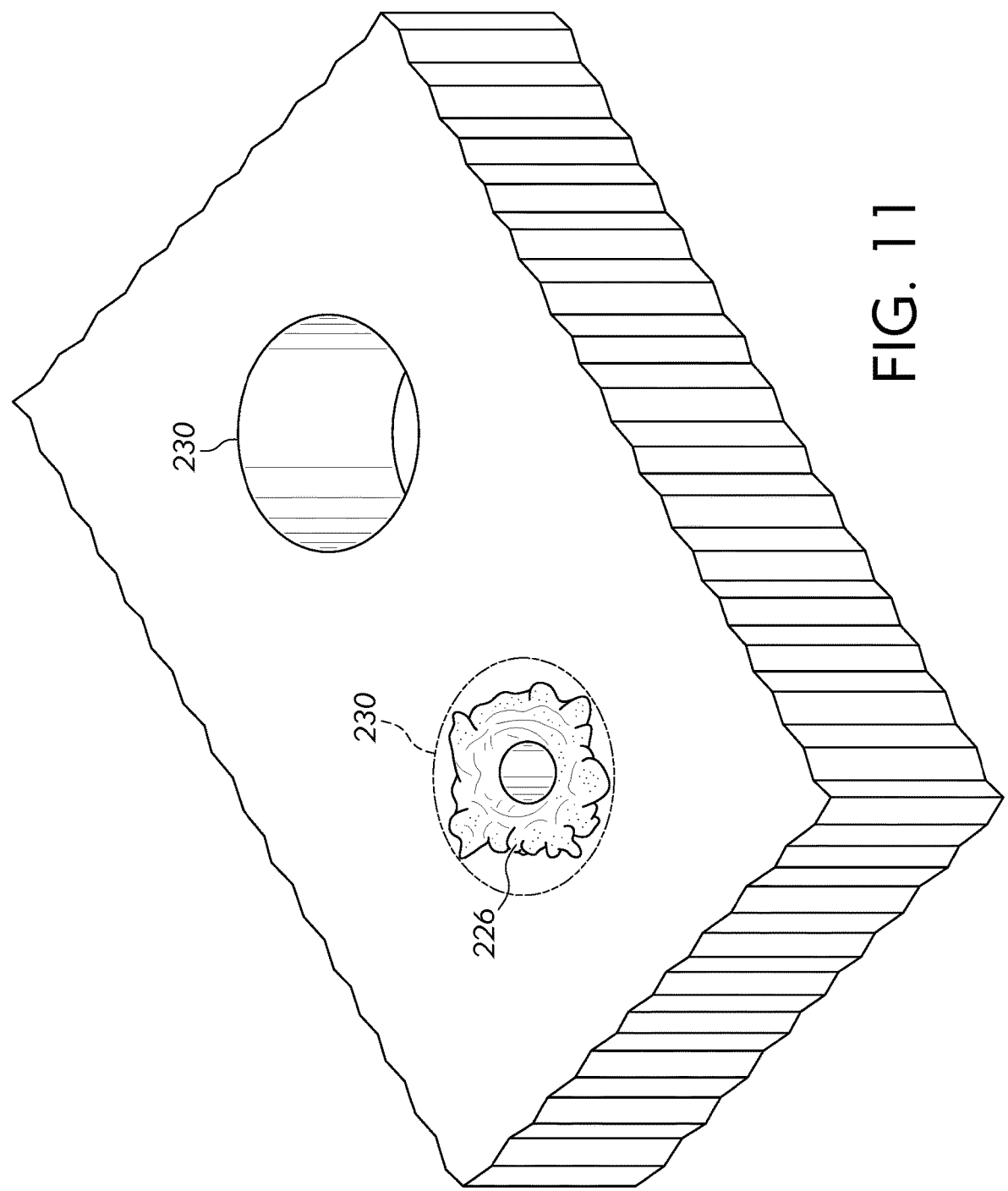

PLASMA ARC TORCH AND CUTTING SYSTEM

BACKGROUND OF THE INVENTION

Field of the Invention

The present invention relates to plasma arc torches for cutting workpieces using a plasma arc, and systems and methods for minimizing molten puddles and top spatter created when piercing workpieces, which facilitates the cutting of high quality small diameter holes.

Description of Related Art

Initially piercing a workpiece with a plasma arc torch can result in top spatter, also known as top dross. As the workpiece is pierced, molten material is displaced from the pierce hole and can accumulate as a molten puddle around the pierce hole. The molten material solidifies as top spatter and adheres to the upper surface of the workpiece around the pierce hole. Top spatter is often a problem when piercing thick workpieces, such as workpieces 0.25 inch thick or greater, and piercing such thick workpieces can result in excessive top spatter. The top spatter makes it difficult to cut small holes of acceptable quality in thick workpieces. The top spatter has a larger diameter than the pierce hole and the torch must cut around the top spatter to achieve a cut hole of acceptable quality. For example, piercing a 1 inch thick workpiece can result in top spatter having a width or diameter exceeding 2 inches. Cutting a hole of acceptable quality having a diameter of 2 inches or less would be impossible in such a scenario. The acceptable hole diameter to material thickness ratio for conventional plasma cutting systems is typically greater than 2:1 due to the width of the top spatter created during piercing. It would be desirable to minimize the size of the molten puddle and resulting top spatter that is created during piercing, which would allow smaller holes of acceptable quality to be cut from the workpiece.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is plasma arc torch having a nozzle body, a nozzle extending distally from the nozzle body, and a shield cap. An outer retaining cap is attached to the plasma arc torch and secures the shield cap to the plasma arc torch. A sleeve is located radially outward from the outer retaining cap and is configured to receive a flow of pressurized gas. An insulator is located between the outer retaining cap and the sleeve. At least one of the sleeve and the insulator forms a gas flow channel configured to direct a gas flow from the sleeve to a distal portion of the outer retaining cap.

In accordance with another aspect of the present invention, provided is a plasma cutting system. The plasma cutting system includes a plasma arc torch and a plasma cutting power supply that supplies a plasma cutting current to the plasma arc torch. A torch actuator moves the plasma arc torch during a cutting operation. A motion controller is operatively connected to the torch actuator to control movements of the plasma arc torch during the cutting operation. A gas controller is configured to control a flow of plasma gas and a flow molten metal clearing gas to the plasma arc torch. The flow of molten metal clearing gas is active during a piercing operation of the plasma arc torch, and the gas controller is configured to automatically determine a completion of the piercing operation and stop the flow of molten metal clearing gas upon determining the completion of the piercing operation.

In accordance with another aspect of the present invention, provided is an attachment for a plasma arc torch. The attachment includes an outer retaining cap that is attachable to the plasma arc torch and that is configured to secure a shield cap to the plasma arc torch. A sleeve is located radially outward from the outer retaining cap and is configured to receive a flow of pressurized gas. An insulator is located between the outer retaining cap and the sleeve. The attachment includes a gas flow channel that configured to direct a gas flow from the sleeve to a distal portion of the outer retaining cap.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 11 shows another result of piercing a workpiece by a plasma arc torch.

DETAILED DESCRIPTION OF THE INVENTION

Figure 1:
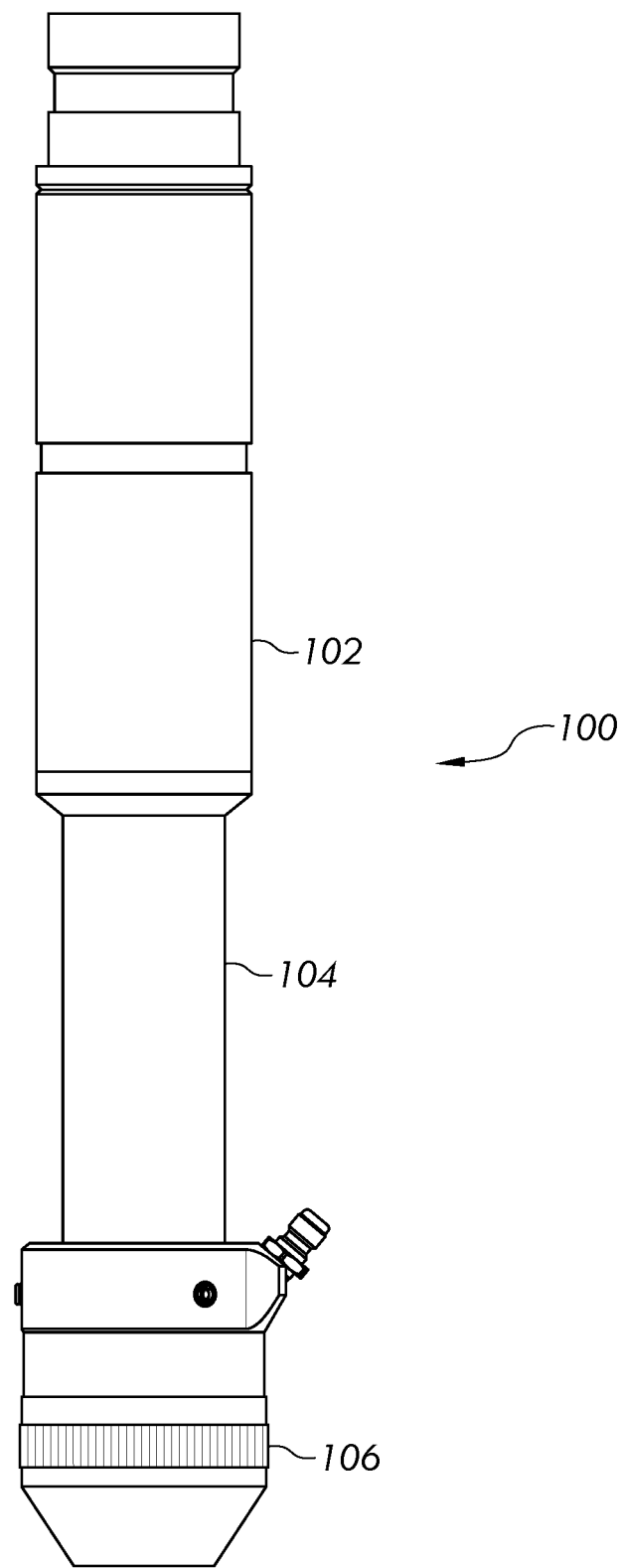
FIG. 1 shows a plasma arc torch.

The present invention relates to plasma arc torches for cutting workpieces using a plasma arc, and systems and methods for minimizing plasma puddles created when piercing workpieces. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Discussed herein are plasma arc torches that can have, among other things, fluid and electrical connections and a handle portion at an upstream end of the torch, and a nozzle, shield cap and outer retaining cap at a downstream or cutting end of the torch. The term "proximal" as used herein refers to the upstream direction of the torch, toward the end of the torch having the handle portion and any fluid and electrical connections. The term "distal" as used herein refers to the downstream direction of the torch, toward the cutting end of the torch.

The present invention reduces or minimizes the molten puddle and resulting top spatter or top dross created during piercing, and also reduces pierce time, by creating a gas flow of molten metal clearing gas outside of the plasma gas flow and shield gas flow. For example, the molten metal clearing gas can flow past an exterior distal portion of the torch's outer retaining cap and around the torch's shield cap to blow the molten material generated during piercing through the pierce hole. The molten metal clearing gas flow is only active during the piercing operation, and is automatically stopped after completion of the piercing operation. In certain embodiments, an additive such as anti-spatter liquid is injected into the molten metal clearing gas flow to help keep the molten material generated during piercing from sticking to the workpiece and allowing the molten material to flow through the pierce hole. For thick workpieces (e.g., about 0.25 inch thick or greater), the present invention can pierce the workpiece faster than conventional plasma arc systems (e.g., approx. 30% reduction in pierce time) and can reduce the size of the top spatter from over 2×(200%) the material thickness to less than 1×(100%) of the material thickness. The present invention allows 1:1 holes (ratio of hole diameter to material thickness) and even smaller holes to be cut from the workpiece with acceptable cut quality, due to the small width of the top spatter created during piercing.

FIG. 1 shows an example plasma arc or plasma cutting torch 100. The plasma arc torch 100 can be a liquid-cooled torch or an air-cooled torch. The torch has a handle portion 102 that can be clamped into an automated cutting device, such as computer numerical control (CNC) plasma cutting table or a robotic arm for example. Distal of the handle portion 102 is a torch body 104, which can be made from a metallic material. Attached to the torch body 104 is an outer retaining cap that secures a shield cap to the torch. The outer retaining cap is part of an attachment 106 for the torch 100.

The attachment 106 provides the flow of molten metal clearing gas during the piercing operation, and the discharge of an additive such as anti-spatter liquid to the workpiece, to minimize the size of the molten puddle and any top spatter generated during piercing.

The provision of molten metal clearing gas and an additive such as anti-spatter liquid will be discussed in the context of the attachment 106 to the plasma arc torch 100. However, it is to be appreciated that the capability of providing molten metal clearing gas and the additive could be built into the torch 100 itself, rather than as an attachment. For example, flow channels for the molten metal clearing gas and the additive could be directly built into the torch 100. The molten metal clearing gas and the additive could flow through a conduit in the torch body 104 toward the distal end of the torch 100 for discharge around the shield gas. The attachment 106 embodiment shown in the drawings does provide the advantage of being removable from the torch 100 when not needed, such as when cutting relatively thin workpieces in which top spatter is less of a problem.

Figure 2:
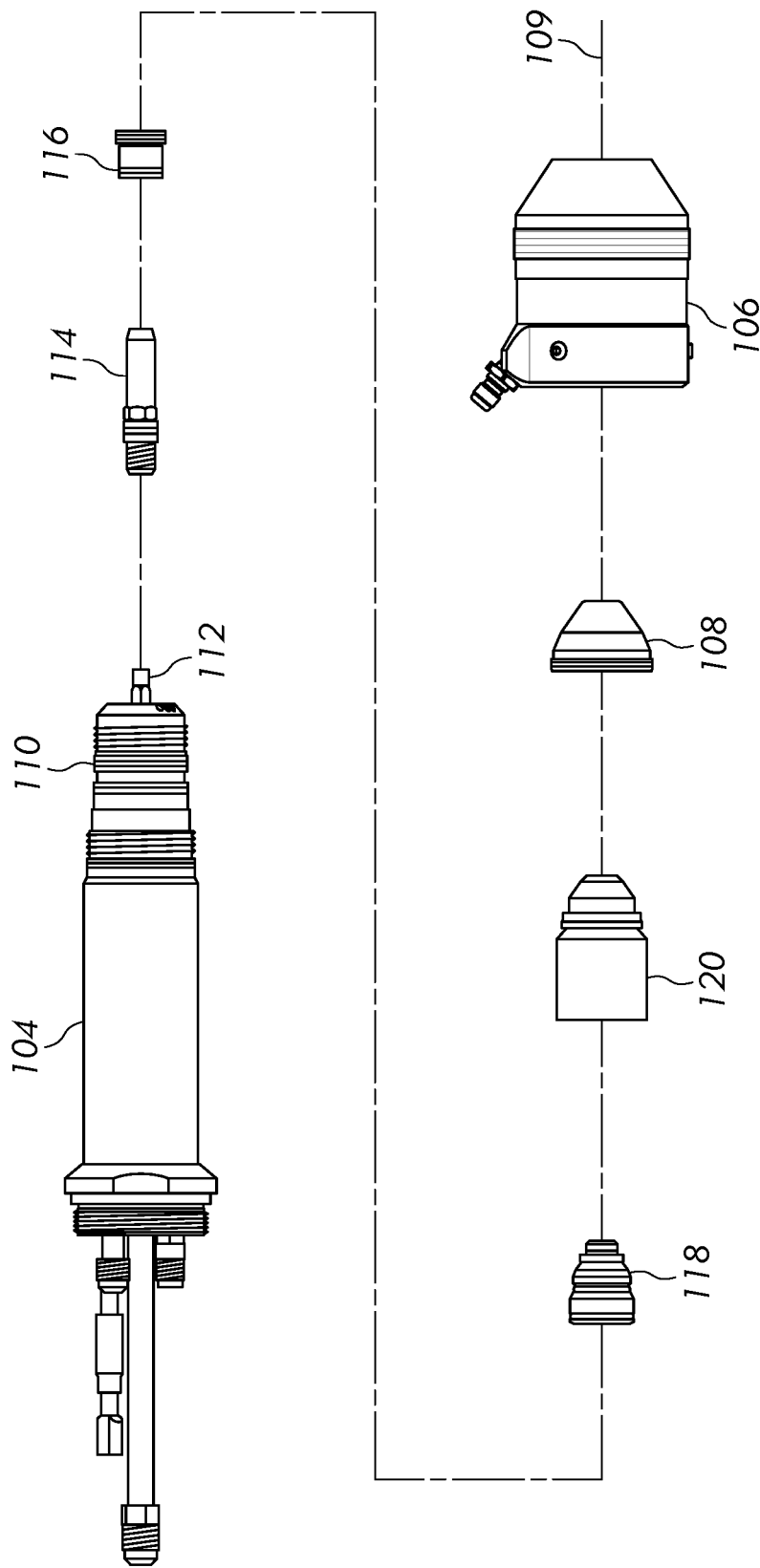
FIG. 2 is an exploded view showing components of the plasma arc torch.

FIG. 2 is an exploded view of the torch showing various components and consumables of the torch displayed along an axis 109 of the torch. The torch body 104, attachment 106, and shield cap 108 are shown in FIG. 2. The shield cap 108 is secured to the torch by an outer retaining cap within the attachment 106 that screws onto the torch body 104. When the attachment 106 is not in use, a conventional outer retaining cap replaces the attachment on the torch. When it desired to use the attachment 106, the conventional outer retaining cap is unscrewed from the torch body 104 and replaced with the attachment.

Extending from the torch body 104 is a nozzle body 110 or anode, and a cooling tube 112. The cooling tube 112 attaches to a cathode within the torch, as does the electrode 114. The torch further includes a swirl ring 116 and nozzle 118. When installed on the torch, the nozzle 118 extends distally from the nozzle body 110. The swirl ring 116 and nozzle 118 are held in place by an inner retaining cap 120 that threads onto the nozzle body 110. The shield cap 108 covers the distal ends of the nozzle 118 and inner retaining cap 120. The electrode 114, swirl ring 116, nozzle 118, inner retaining cap 120, shield cap 108, and outer retaining cap can all be considered consumables of the plasma arc torch.

Figure 3:
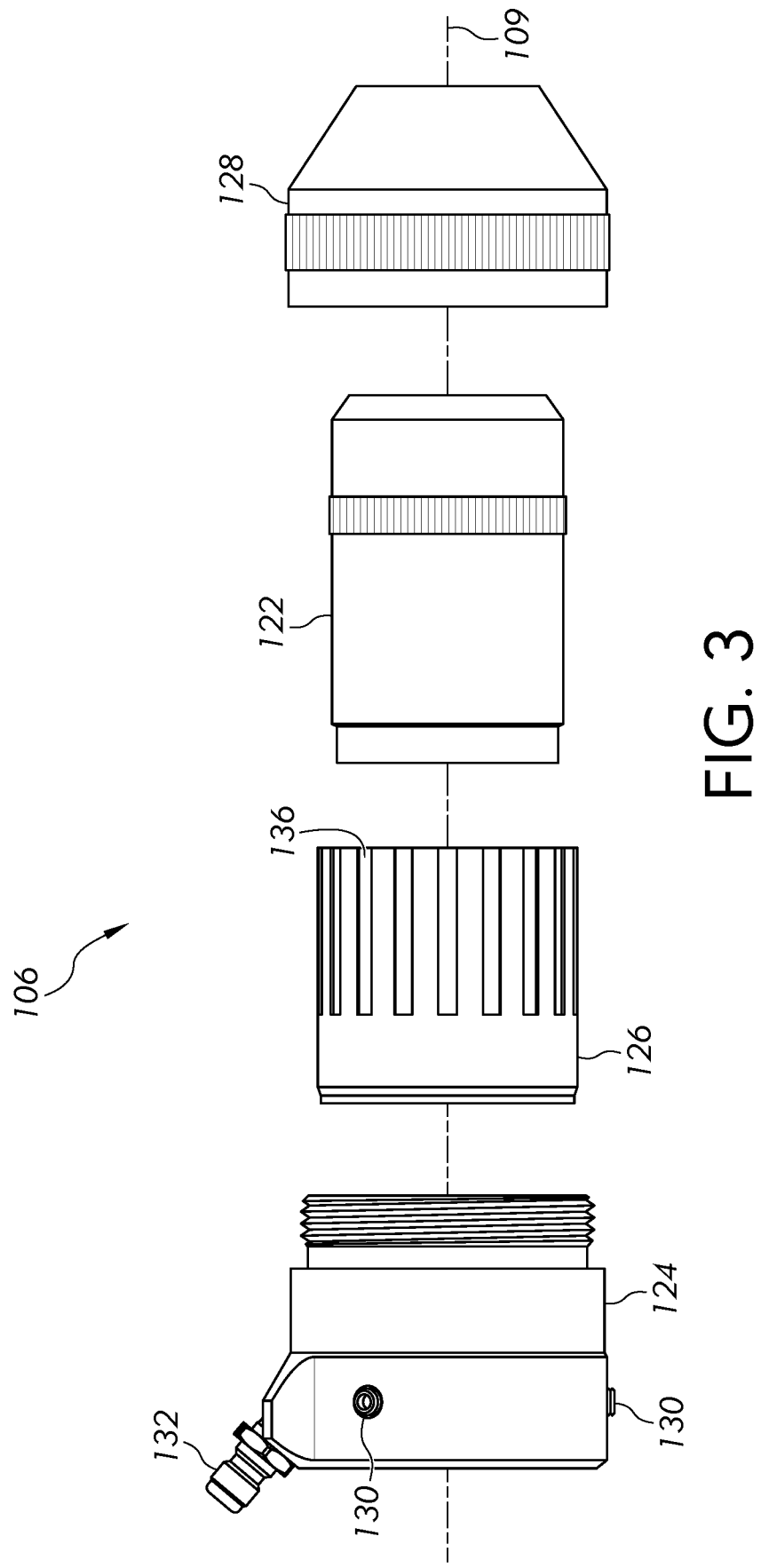
FIG. 3 is an exploded view showing components of an attachment for the plasma arc torch.
Figure 4:
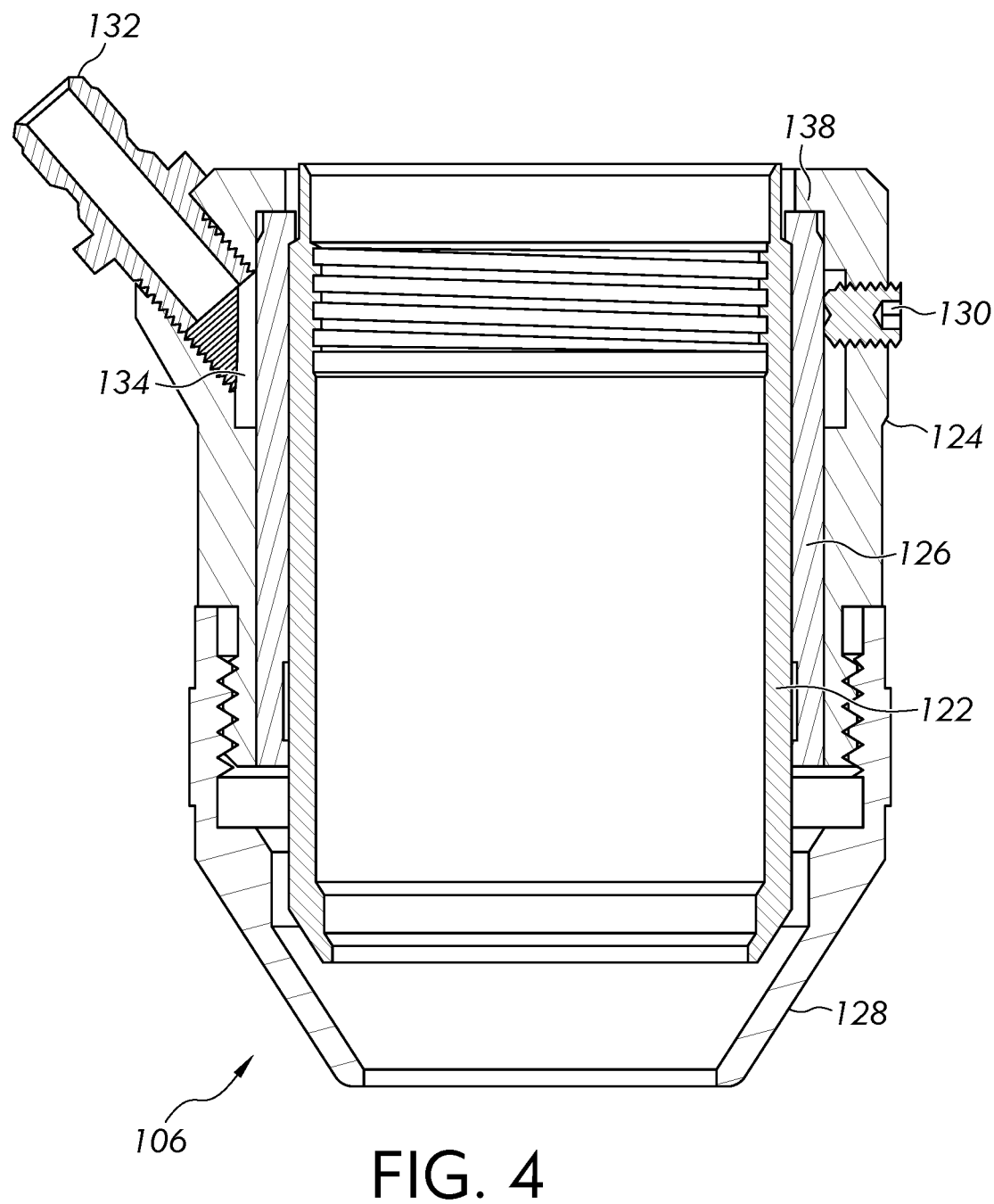
FIG. 4 is a cross-sectional view of the attachment for the plasma arc torch.
Figure 5:
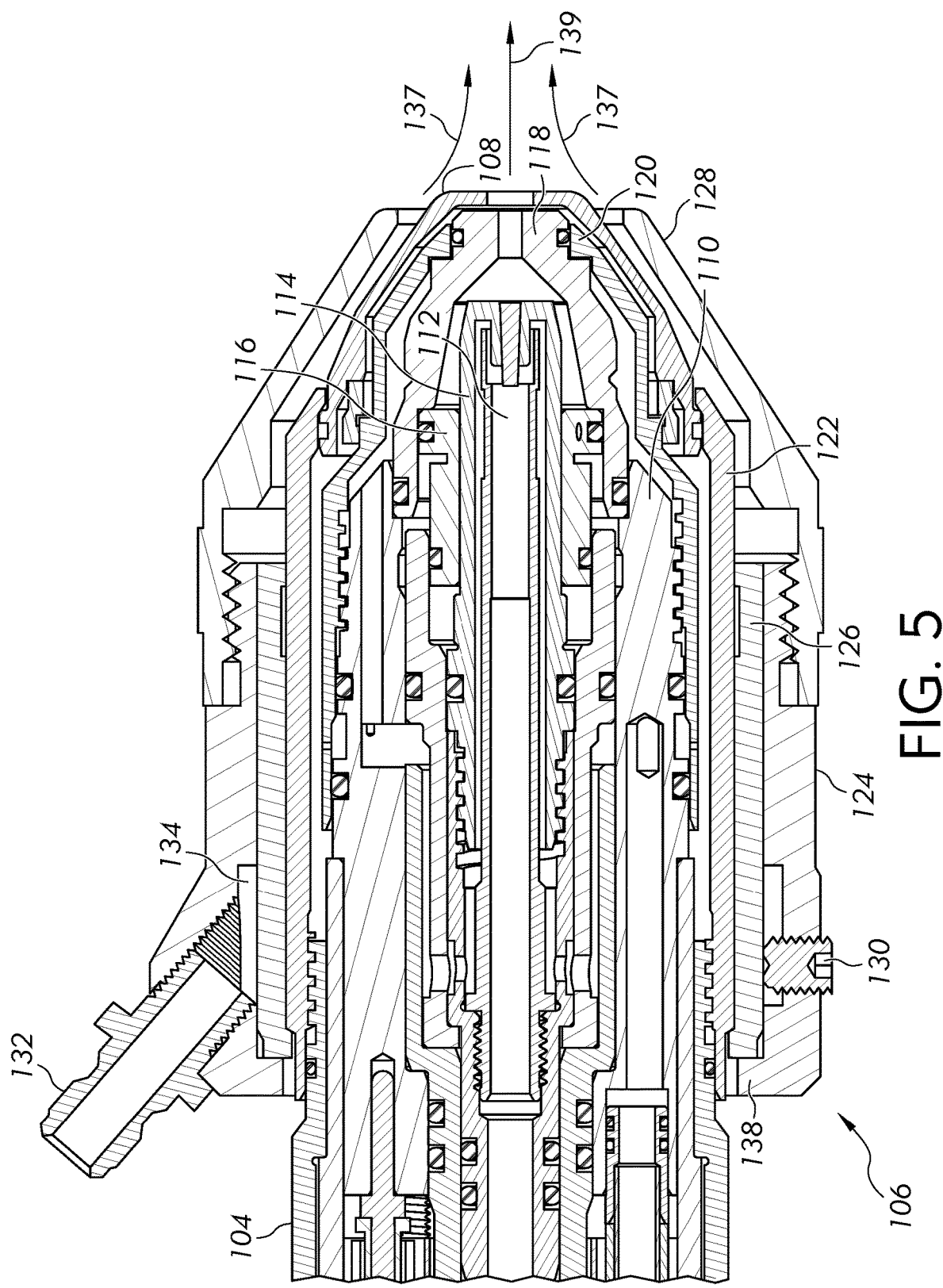
FIG. 5 is a cross-sectional view of a portion of the plasma arc torch.

FIG. 3 is an exploded view of the attachment 106, and FIG. 4 is a cross-sectional view of the attachment. The attachment includes the outer retaining cap 122 that secures the shield cap (not shown) to the torch. The outer retaining cap 122 can be made from a metallic material such as brass or other suitable metal or alloy. A sleeve 124 is located radially outward from the outer retaining cap 122. The sleeve 124 can also be made from a metallic material, such as aluminum, stainless steel, or other suitable metal or alloy. An insulator 126 is located between the outer retaining cap 122 and the sleeve 124. The insulator 126 can be made from a plastic material, such as glass reinforced PEEK (polyetheretherketone), polyetherimide and the like. The insulator 126 electrically insulates the sleeve 124 from the outer retaining cap 122. The insulator 126 is attached to the outer retaining cap 122, such as via a press fit or an adhesive. The attachment 106 further includes a shield 128 that extends from the sleeve 124 axially past the distal end of the outer retaining cap 122. In the embodiment shown, the sleeve 124 has male threads and the shield 128 has female threads for attaching the shield to the sleeve; however, other attachment mechanisms are possible. The shield 128 is detachable from the sleeve 124 to facilitate assembly of the attachment 106 (e.g., to allow the outer retaining cap 122 and insulator 126 assembly to be inserted into the sleeve); however in certain embodiments the sleeve and shield could be integrally formed. As best seen in FIG. 5, the shield 128 is radially offset from the outer retaining cap 122 and the shield cap 108 so as to form an air gap between the shield and both of the outer retaining cap and the shield cap. During a piercing operation, the air gap conducts the flow of molten metal clearing gas past the outer retaining cap 122 and the shield cap 108 to the distal terminal end of the plasma arc torch and around the plasma arc. The distal portion of the shield 128 has a generally frustoconical shape, while the proximal portion of the shield is generally cylindrical. The shield 128 can be made from a metallic material, such as copper or a copper alloy, or other suitable metal or alloy.

In the embodiment shown in FIGS. 3 and 4, the sleeve 124 is attached to the outer retaining cap 122 and insulator 126 assembly by a plurality of fasteners 130 spaced around the circumference of the sleeve. For example, the sleeve 124 can be attached via three equally spaced set screws, thumbscrews, etc., although any suitable number of fasteners can be used. The fasteners 130 permit the sleeve 124 to be rotated relative to the torch and outer retaining cap 122, so that a gas fitting 132 that projects from the sleeve 124 can be located at a convenient position. The gas fitting 132 can be a quick disconnect type fitting for attaching to a gas hose to the sleeve 124. Once the sleeve 124 is installed onto the outer retaining cap 122 and insulator 126 assembly with the gas fitting 132 placed at a convenient location relative to the torch, the sleeve and shield 128 will seldom need to be removed from the outer retaining cap/insulator assembly. When torch consumables need to be changed, the hose can be disconnected from the gas fitting 132 and the outer retaining cap 122 unscrewed from the torch with the sleeve 124 and shield 128 still attached. Removing the attachment 106 will release the shield cap 108 (FIG. 5) and allow the inner retaining cap 120 to be removed from the torch.

Via the gas fitting 132, the sleeve 124 receives a flow of pressurized molten metal clearing gas, and optionally an additive (e.g., anti-spatter liquid) entrained in the molten metal clearing gas, from a gas source during a piercing operation. The molten metal clearing gas can be air or other gasses (e.g., nitrogen, argon, etc.) The inner surface of the sleeve 124 includes an counter bore or channel that creates an annular plenum 134 for the molten metal clearing gas. The annular plenum 134 is in fluid communication with the gas fitting 132. A plurality of axially-extending gas flow channels direct the flow of molten metal clearing gas from the sleeve 124 to a distal portion of the outer retaining cap 122. The shield 128 further directs the flow of molten metal clearing gas around the distal terminal end of the outer retaining cap 122 and around the shield cap 108 (FIG. 5). The axially-extending gas flow channels can be located in the sleeve 124 and/or in the insulator 126 and can extend from the annular plenum 134 to a distal terminal end of the sleeve and/or insulator. However, in the embodiment shown in FIGS. 3 and 4, the gas flow channels are formed as a plurality of grooves 136 or milled slots arrayed annularly around the outer surface of the insulator 126. The grooves 136 extend axially in the proximal direction to the annular plenum 134, and in the distal direction to the terminal ends of the sleeve 124 and insulator 126. The grooves 136 serve as passages for the molten metal clearing gas while providing a restriction to flow which helps to evenly distribute the gas. In alternative embodiments, the gas flow channels could be located inside of the walls of the sleeve 124 and/or insulator 126, rather than be formed as surface grooves or slots.

The proximal end of the sleeve 124 forms an inwardly-projecting annular shoulder 138. The annular shoulder provides a stop surface for the outer retaining cap 122 and insulator 126 assembly. With the shield 128 removed, the outer retaining cap 122 and insulator 126 assembly can be slid into the sleeve 124 until the insulator contacts the annular shoulder 138. The fasteners 130 can then be tightened to attach the sleeve 124 to the outer retaining cap 122 and insulator 126 assembly. The shield 128 can then be placed over the distal terminal end of the outer retaining cap 122 and screwed onto the sleeve 124 to complete the assembly of the attachment 106 for the plasma arc torch.

FIG. 5 is a cross-sectional view of the distal end of the plasma arc torch with the attachment 106 for clearing molten installed on the torch. Various components discussed above are shown in FIG. 5. The air gap for conveying the flow 137 of molten metal clearing gas and anti-spatter liquid that is formed between the shield 128 of the attachment 106 and the outer retaining cap 122 and shield cap 108 can be seen in FIG. 5. The flow 137 of molten metal clearing gas and any entrained anti-spatter liquid surrounds the plasma and shield gas flows 139 during the piercing operation. The distal terminal end or tip of the shield cap 108 can extend axially past the terminal end of the shield 128 on the attachment 106, and project out of the shield 128 as shown. Having the shield cap 108 project out of the shield 128 on the attachment 106 allows the plate sensing capabilities built into the torch and plasma cutting power supply to operate properly. The plate sensing capabilities provide contact sensing between the torch and a workpiece.

Figure 6:
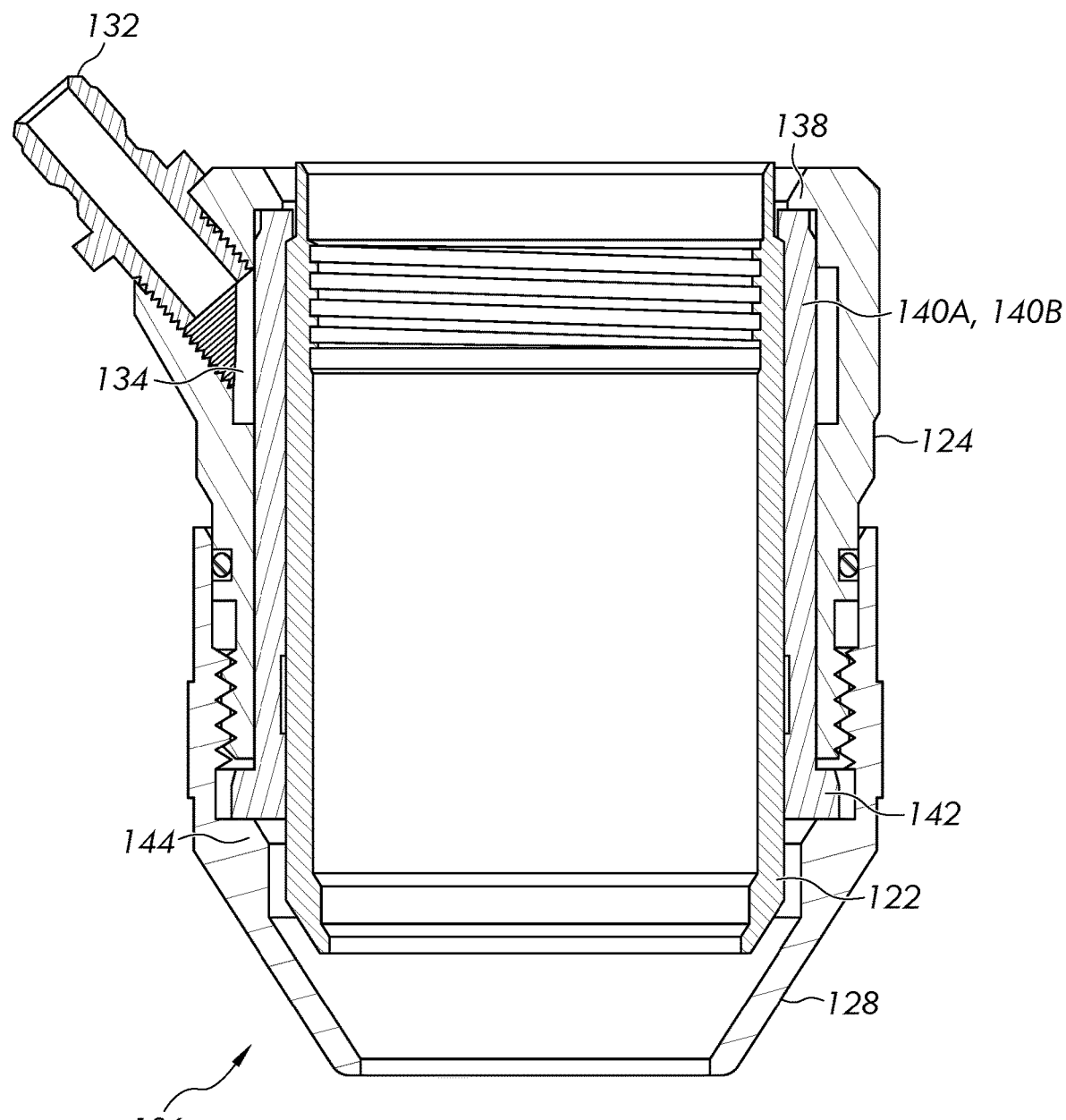
FIG. 6 is a cross-sectional view of a second embodiment of the attachment for the plasma arc torch.
Figure 7:
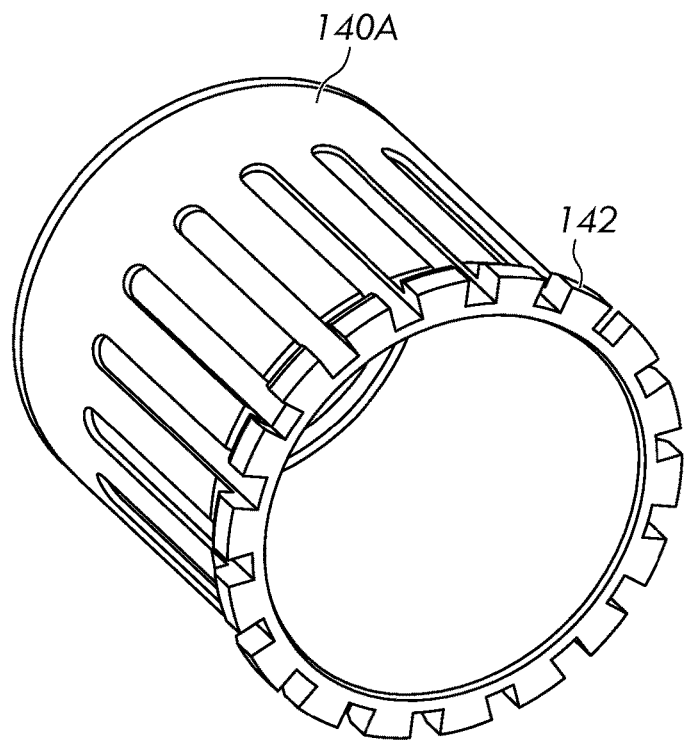
FIG. 7 shows an insulator for the second embodiment of the attachment for the plasma arc torch.
Figure 8:
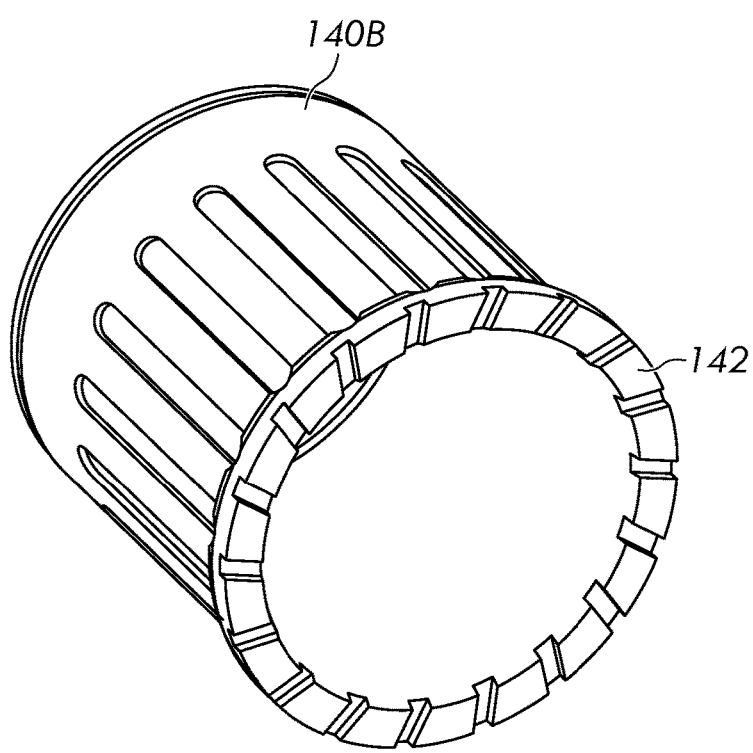
FIG. 8 shows an insulator for the second embodiment of the attachment for the plasma arc torch.

FIG. 6 shows a further embodiment of the attachment 106, which lacks the fasteners discussed above for attaching the sleeve 124 to the outer retaining cap 122 and insulator 140A, 140B assembly. Two different embodiments of the insulator 140A, 140B are shown in FIGS. 7 and 8. The insulator 140A, 140B has a flange 142 at its distal terminal end. As the shield 128 is screwed onto the sleeve 124, an inwardly-projecting annular shoulder 144 on the shield contacts the flange 142 on the insulator 140A, B. The annular shoulder 144 on the shield 128 and the annular shoulder 138 on the sleeve 124 clamp onto the insulator 140A, B to hold the sleeve in place on the outer retaining cap 122. The flange 142 on the insulator can include grooves or slots through which the molten metal clearing gas can flow. The slots can extend generally radially as shown in FIG. 7 to provide a non-swirling gas flow, or the slots can be angled radially as shown in FIG. 8 to provide a swirl to the molten metal clearing gas. The shield 128 can include an annular groove or undercut to accommodate the flange 142 and provide a plenum for the molten metal clearing gas.

Figure 9:
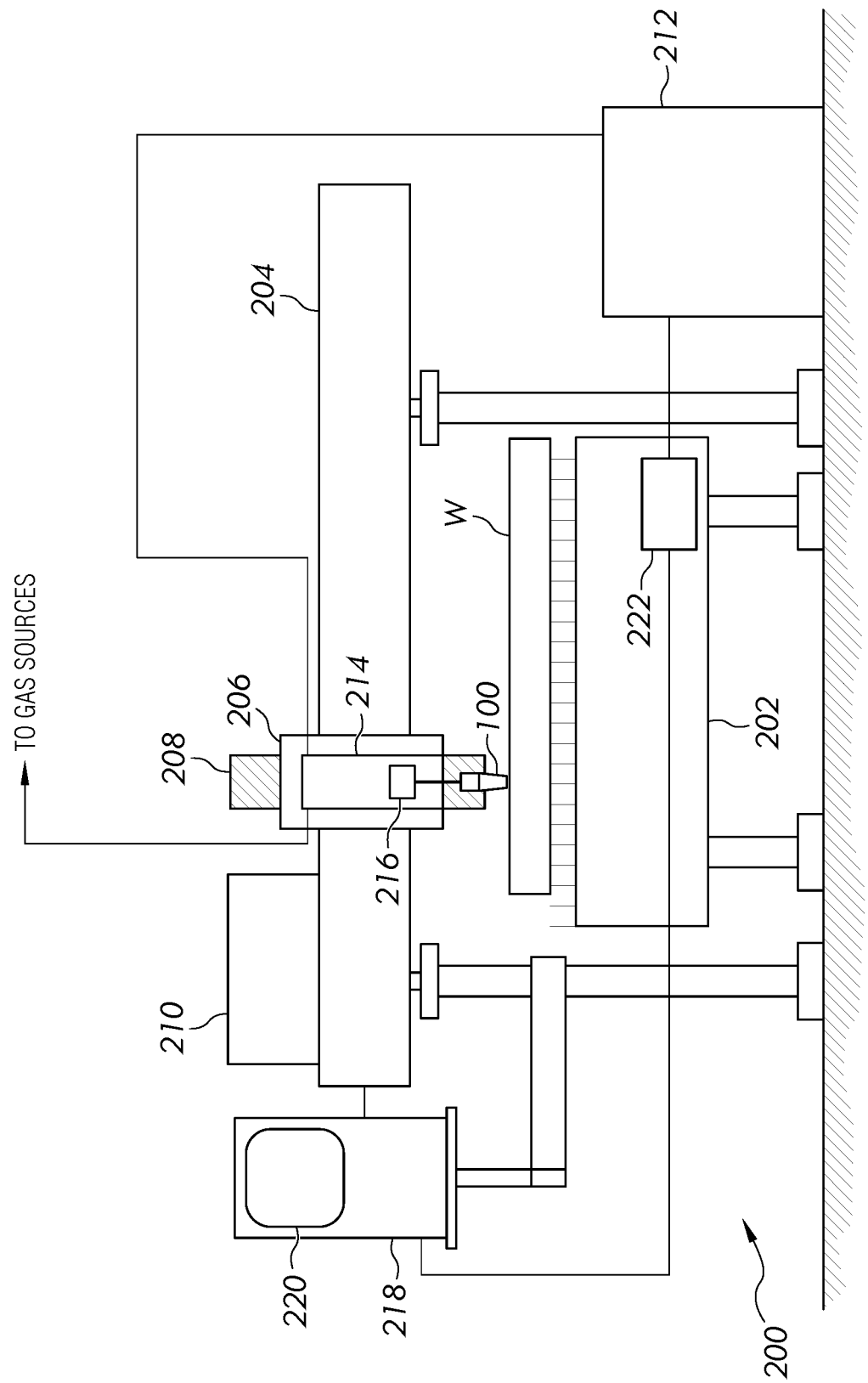
FIG. 9 is a schematic view of a plasma cutting system.

FIG. 9 schematically shows various components of an example plasma cutting system 200. The system 200 includes an open air plasma cutting table 202 which cuts a workpiece W in open air (not underwater). The plasma cutting table 202 includes a torch actuator, such as a gantry 204 and torch carriage 206, that moves the torch during a cutting operation. The gantry 204 can move back and forth along the length of the cutting table's main body in a first direction (e.g., in a Y direction). The gantry 204 can move on tracks or rails that extend along the sides of the table 202. The plasma arc torch 100 is attached to the torch carriage 206, which is mounted on the gantry 204. The torch carriage 206 can move back and forth along the gantry 204 in a second direction (e.g., in an X direction) that is perpendicular to the first direction. The plasma cutting table 202 can be programmed to make precise cuts in the workpiece W through controlled movements of the torch carriage 206 and gantry 204 in the X and Y directions, respectively. In certain embodiments, the torch carriage 206 can move the plasma arc torch 100 vertically toward and away from the workpiece W (e.g., in a Z direction), so that the torch can be moved in three perpendicular directions. In certain embodiments, the torch carriage 206 can also rotate or tilt the torch 100 in a plane perpendicular to the plane of the table (e.g., in the X-Z plane), to make beveled cuts.

The plasma cutting system 200 can include a torch height controller 208 which can be mounted to the gantry 204. The system 200 can also include a drive system 210 which is used to provide the motion to the torch 100 relative to a workpiece W positioned on the table 202. A plasma cutting power supply 212 is coupled to the torch 100 to provide the desired plasma cutting current used to create the plasma arc.

The system 100 can further include a gas console or gas controller 214 that is configured to regulate gas flow rates and pressures of plasma and shield gases during the cutting operation and also control the flow/pressure of molten metal clearing gas provided to the torch 100 and the injection of any additives, such as anti-spatter liquid. Various gasses can be used for the plasma, shield and molten metal clearing gas, such as air, nitrogen, oxygen, etc. The plasma, shield and molten metal clearing gas can be the same gas or different gasses. The gas console 214 can include proportional valves and the like for controlling the pressure and/or flow rate of the plasma, shield and molten metal clearing gasses.

The gas controller 214 provides the molten metal clearing gas flow to the torch 100 only during the piercing operation, such as just prior to or upon commencement of the piercing operation and until the piercing operation is completed or immediately thereafter. The gas controller 214 communicates with the plasma cutting power supply 212 to determine when the piercing operation begins and is completed. The plasma cutting power supply 212 can inform the gas controller 214 about the starting and completion of a piercing operation, or the gas controller can determine these states itself (e.g., based on plasma voltage/current information received from the plasma cutting power supply). For example, the plasma cutting power supply 212 can transmit a plasma voltage signal to the gas controller 214 during piercing, and the gas controller can automatically determine when the piercing operation is complete from an increase in the plasma voltage. When the gas controller 214 determines that the workpiece W has been pierced, the gas controller stops the flow of molten metal clearing gas.

The molten metal clearing gas pushes molten material that is generated during piercing through the pierce hole. An exemplary pressure range for the molten metal clearing gas is 5-70 psi, although other pressures could be used. An exemplary flow range for the molten metal clearing gas is 500 to 1200 scfh, although other flow rates could be used.

An additive, such as anti-spatter liquid, can be added to the flow of molten metal clearing gas. The additive is sprayed onto the surface of the workpiece W at the pierce site to reduce the ability of top spatter to stick to the workpiece and/or reduce the surface tension of the molten puddle. Anti-spatter liquid typically contains a silicone or similar ingredient that is often a petroleum-based or water-based solvent that prevents the spatter from sticking to the workpiece. Anti-spatter liquid also reduces the surface tension of the molten puddle and facilitates the movement of the puddle by the molten metal clearing gas. Anti-spatter liquids are known and their composition need not be discussed in detail. In certain embodiments, the additive can be a powder that is entrained in the molten metal clearing gas and blown onto the workpiece at the pierce site, rather than an aerosol liquid. The additive provided by the molten metal clearing gas can be any substance that reduces the ability of top spatter to stick to the workpiece and/or reduces the surface tension of the molten puddle. In certain embodiments, the additive can be sprayed onto the workpiece separate from the molten metal clearing gas. The attachment or torch can include dedicated ports and conduits for the additive in such embodiments.

The plasma cutting system 200 can include a reservoir of the additive. The reservoir can be located in the plasma cutting power supply 212 or in the gas controller 214 for example. The gas controller 214 can include an injector, such as an anti-spatter liquid injector 216, that injects the additive into the flow of molten metal clearing gas. The injector 216 can include a pump and an electronic injector, or a mechanical device such as a venturi injector. The gas controller 214 is operatively connected to the anti-spatter liquid injector 216 to control its operations. During the piercing operation, the gas controller 214 can activate the anti-spatter liquid injector 216 to squirt anti-spatter liquid into the molten metal clearing gas flow and onto the workpiece W. The anti-spatter liquid will help the molten metal generated during piercing to flow through the pierce hole as the molten metal is pushed by the flow of clearing gas.

An operator of the plasma cutting system 200 can activate/deactivate the molten metal clearing gas and/or the additive via the user interfaces 220, 222. The torch attachment can remain installed on the torch when molten metal clearing gas or the additive is deactivated.

The plasma cutting system 200 can include a CNC motion controller 218. The controller 218 is operatively connected to the gantry 204, torch carriage 206, torch height controller 208, etc., to control the movements of the torch 100 during the cutting operation. The controller 218 can include a user input/display screen or user interface 220. The user interface 220 and controller 218 are used by a user to input and read cutting operational parameters and data, and allow the system 200 to be operated as an automated, programmable cutting system. Various input parameters can be input by the user into the controller 218, via the user interface 220 (or other means) including: torch current, material type, material thickness, cutting speed, torch height, plasma and shield gas composition, whether to perform molten metal clearing during piercing, etc. The table 202 can also include a user interface 222 that is operatively connected to the CNC and/or the plasma cutting power supply 212. In embodiments employing a robotic arm as the torch actuator rather than a gantry and torch carriage, the CNC can be a robot controller that controls the movements of the robotic arm. The plasma cutting system 200 can have many different configurations, and embodiments are not limited to that shown in FIG. 9, which is intended to be exemplary.

The motion controller 218, gas controller 214, or plasma cutting power supply 212 can include an electronic controller and can include one or more processors. For example, the controllers can include one or more of a microprocessor, a microcontroller, a digital signal processor (DSP), an application specific integrated circuit (ASIC), a field-programmable gate array (FPGA), discrete logic circuitry, or the like. The controllers can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controllers can further include one or more analog-to-digital (A/D)

converters for processing various analog inputs to the controller. The program instructions for the motion controller 218 can include cut charts or nesting software. Such instructions typically include cutting information including instructions for the system 200 when cutting various holes or contours, taking into account the sizes and shapes of the holes/contours and the material being cut. As is generally understood the controllers can allow a user to cut numerous successive holes, contours or a combination of holes and contours in a workpiece without stopping between cuts. For example, the operator can select a cutting program that includes both hole and contour cutting instructions, and the motion controller 218 will determine the order and positioning of the cuts, as well as the various parameters of the cuts based on the user input information.

The controllers can operate in a networked environment using logical and/or physical connections to one or more remote computers. Examples of the remote computers include workstations, server computers, routers, personal computers, and the like. The networked environment can include local area networks (LAN) and/or wide area networks (WAN). Such networking environments are commonplace in offices, enterprise-wide computer networks, intranets and the Internet. When used in a LAN networking environment, the controllers are connected to the local network through a network interface or adapter. When used in a WAN networking environment, the controllers typically include a modem or network interface, or are connected to a communications server on the LAN, or have other means for establishing communications over the WAN, such as the Internet. In a networked environment, program modules implemented by the controllers, or portions thereof, may be stored in a remote memory storage device. It will be appreciated that network connections described herein are exemplary and other means of establishing communications links between devices may be used.

Figure 10:
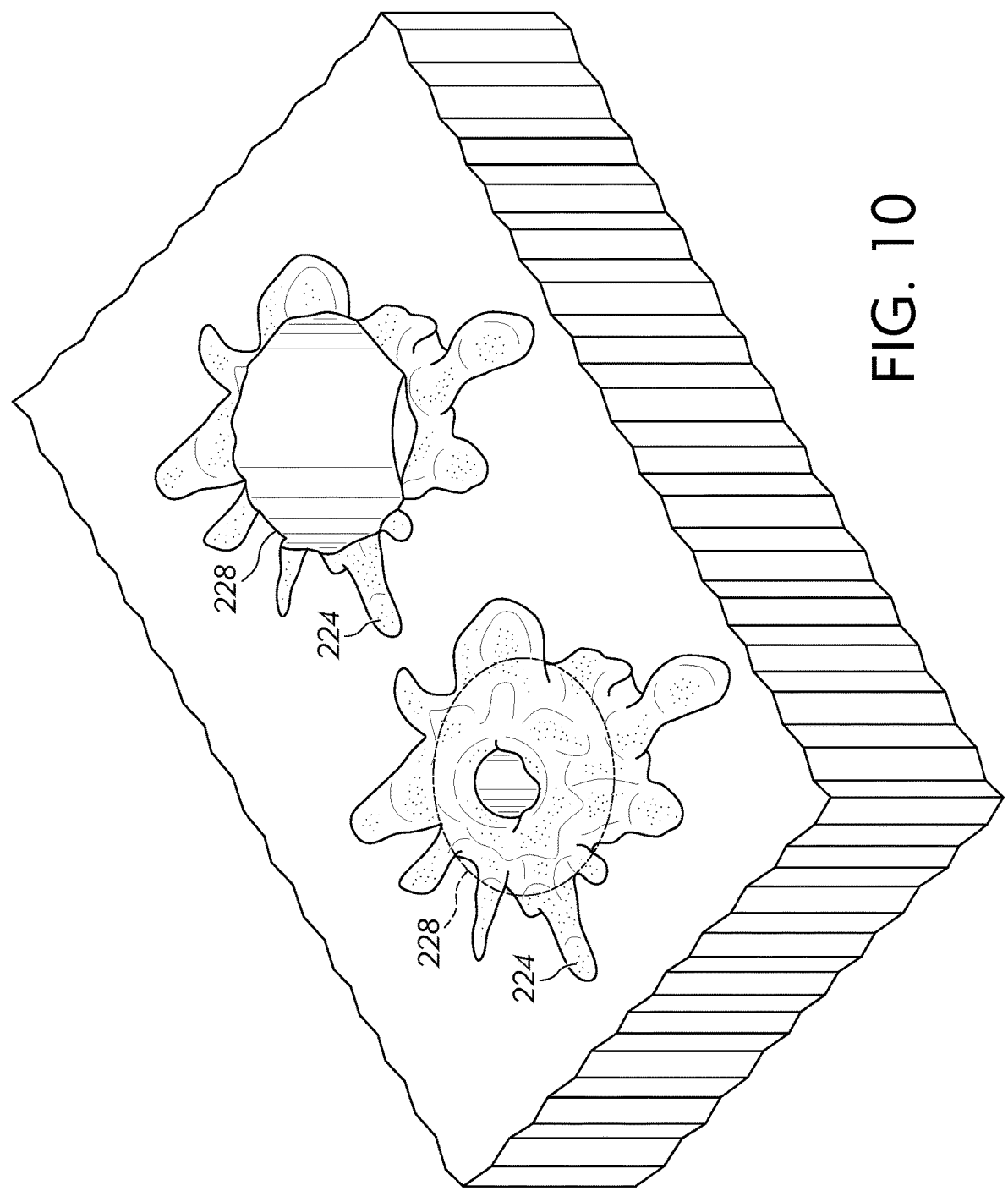
FIG. 10 shows a result of piercing a workpiece by a plasma arc torch.

FIG. 10 shows the result of a conventional piercing operation on a thick workpiece (e.g., about 0.25 inch thick or greater) and cutting approximately a 1:1 hole through the workpiece, and FIG. 11 shows the result of a piercing operation and cutting approximately a 1:1 hole on a thick workpiece using the torch attachment discussed above. The left image in FIGS. 10 and 11 show the initial pierce holes surrounded by spatter 224, 226, and the right image shows the approximately 1:1 holes 228, 230 cut around the pierce holes. The width of the top spatter 224 in FIG. 10 is more than twice the thickness of the workpiece. If a hole is to be cut from the workpiece in FIG. 10, its diameter would have to be larger than the width of the top spatter to ensure a quality cut. This results in a greater than 2:1 hole diameter to material thickness ratio. It can be seen that the approx. 1:1 hole 228 is surrounded by the spatter 224 created during the piercing operation. The width of the top spatter 226 in FIG. 11 is much smaller than in FIG. 10 due to the molten metal clearing gas flow and the injection of a small amount of anti-spatter liquid during the piercing operation. The width of the top spatter 226 can be less than the material thickness (e.g., between 40% and 95% of the material thickness), which allows 1:1 and smaller holes to be cut from the workpiece. It can be seen that the approx. 1:1 hole 230 in FIG. 11 is free of surrounding spatter.

In certain embodiments, the anti-spatter liquid can be sprayed during the cutting operation, after piercing, as the torch is moved about the workpiece. In such embodiments, the gas controller will continue to provide a flow of molten metal clearing gas after the piercing operation is completed. Instead of a providing flow of molten metal clearing gas toward the workpiece, the torch attachment could be configured to provide a vacuum that sucks the molten metal away from the workpiece during piercing, rather than pushing it through the pierce hole. The vacuum attachment can move axially along the torch from a retracted position when not in use to a deployed position adjacent to or in contact with the workpiece. When the workpiece is pierced, the vacuum can be turned off and the attachment retracted from the workpiece. Anti-spatter liquid can be sprayed onto the workpiece from the vacuum attachment to help keep the molten material generated during piercing from sticking to the workpiece.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A plasma arc torch, comprising:
a nozzle body;
a nozzle extending from the nozzle body;
a shield cap;
an outer retaining cap attached to the plasma arc torch that secures the shield cap to the plasma arc torch;
a sleeve located radially outward from the outer retaining cap and configured to receive a flow of pressurized gas; and
an insulator located between the outer retaining cap and the sleeve,
wherein at least one of the sleeve and the insulator forms a gas flow channel configured to direct a gas flow from the sleeve to a distal portion of the outer retaining cap, wherein the gas flow channel comprises a plurality of grooves arrayed annularly around an outer surface of the insulator and wherein the sleeve includes an annular plenum, and the plurality of grooves extend axially from the annular plenum to a distal terminal end of the insulator.

2. The plasma arc torch of claim 1, further comprising a gas fitting mounted to the sleeve and in fluid communication with the annular plenum.

3. A plasma arc torch, comprising:
a nozzle body;
a nozzle extending from the nozzle body;
a shield cap;
an outer retaining cap attached to the plasma arc torch that secures the shield cap to the plasma arc torch;
a sleeve located radially outward from the outer retaining cap and configured to receive a flow of pressurized gas;
an insulator located between the outer retaining cap and the sleeve; and
a shield extending from the sleeve axially past a distal terminal end of the outer retaining cap, wherein at least one of the sleeve and the insulator forms a gas flow channel configured to direct a gas flow from the sleeve to a distal portion of the outer retaining cap, and wherein the shield is radially offset from the outer retaining cap and the shield cap so as to form an air gap between the shield and both of the outer retaining cap and the shield cap for conducting the gas flow to a distal terminal end of the plasma arc torch.

4. A plasma cutting system, comprising:
a plasma arc torch;
a plasma cutting power supply that supplies a plasma cutting current to the plasma arc torch;

a torch actuator that moves the plasma arc torch during a cutting operation;

a motion controller operatively connected to the torch actuator to control movements of the plasma arc torch during the cutting operation; and a gas controller configured to control a flow of plasma gas and a flow molten metal clearing gas to the plasma arc torch, wherein the flow of molten metal clearing gas is active during a piercing operation of the plasma arc torch, and the gas controller is configured to automatically determine a completion of the piercing operation and stop the flow of molten metal clearing gas upon determining the completion of the piercing operation.

5. The plasma cutting system of claim 4, further comprising an injector that injects an additive into the flow of molten metal clearing gas, wherein the additive is configured to reduce a surface tension of a molten puddle created during the piercing operation.

6. The plasma cutting system of claim 5, wherein the additive is an anti-spatter liquid, and wherein the gas controller is operatively connected to the injector to control operations of the injector.

7. The plasma cutting system of claim 4, wherein the gas controller is further configured to control a discharge of anti-spatter liquid to the plasma arc torch.

8. The plasma cutting system of claim 4, wherein the gas controller is further configured to control a discharge of an additive to the plasma arc torch, wherein the additive is configured to reduce a surface tension of a molten puddle created during the piercing operation.

9. The plasma cutting system of claim 4, wherein the plasma cutting power supply provides a plasma voltage signal to the gas controller, and the gas controller determines the completion of the piercing operation based on a change in the plasma voltage signal.

10. The plasma cutting system of claim 4, wherein the plasma arc torch includes:
a nozzle body;
a nozzle extending from the nozzle body;
a shield cap;
an outer retaining cap attached to the plasma arc torch that secures the shield cap to the plasma arc torch;
a sleeve located radially outward from the outer retaining cap and that receives the flow of molten metal clearing gas to the plasma arc torch; and
an insulator located between the outer retaining cap and the sleeve,
wherein at least one of the sleeve and the insulator forms a gas flow channel configured to direct the flow of molten metal clearing gas from the sleeve to a distal portion of the outer retaining cap.

11. The plasma cutting system of claim 10, wherein the sleeve includes an annular plenum, and the gas flow channel extends from the annular plenum to a distal end of the sleeve.

12. The plasma cutting system of claim 11, further comprising a gas fitting mounted to the sleeve and in fluid communication with the annular plenum.

13. The plasma cutting system of claim 10, wherein the gas flow channel comprises a plurality of grooves arrayed annularly around an outer surface of the insulator.

14. The plasma cutting system of claim 13, wherein the sleeve includes an annular plenum, and the plurality of grooves extend axially from the annular plenum to a distal terminal end of the insulator.

15. The plasma cutting system of claim 10, further comprising a shield extending from the sleeve axially past a distal terminal end of the outer retaining cap, wherein the shield is radially offset from the outer retaining cap and the shield cap so as to form an air gap between the shield and both of the outer retaining cap and the shield cap for conducting the flow of molten metal clearing gas to a distal terminal end of the plasma arc torch.

16. An attachment for a plasma arc torch, comprising:
an outer retaining cap that is attachable to the plasma arc torch and that is configured to secure a shield cap to the plasma arc torch;
a sleeve located radially outward from the outer retaining cap and configured to receive a flow of pressurized gas;
an insulator located between the outer retaining cap and the sleeve; and
a gas flow channel configured to direct a gas flow from the sleeve to a distal portion of the outer retaining cap, wherein the gas flow channel comprises a plurality of grooves arrayed annularly around an outer surface of the insulator and wherein the sleeve includes an annular plenum, and the plurality of grooves extend axially from the annular plenum to a distal terminal end of the insulator.

17. The attachment of claim 16, further comprising a gas fitting mounted to the sleeve and in fluid communication with the annular plenum.

18. An attachment for a plasma arc torch, comprising:
an outer retaining cap that is attachable to the plasma arc torch and that is configured to secure a shield cap to the plasma arc torch;
a sleeve located radially outward from the outer retaining cap and configured to receive a flow of pressurized gas;
an insulator located between the outer retaining cap and the sleeve;
a gas flow channel configured to direct a gas flow from the sleeve to a distal portion of the outer retaining cap; and
a shield extending from the sleeve axially past a distal terminal end of the outer retaining cap, wherein the shield is radially offset from the outer retaining cap so as to form an air gap between the shield and the outer retaining cap for conducting the gas flow to a distal terminal end of the plasma arc torch.

19. A plasma cutting method, comprising the steps of:
providing an open air plasma cutting system for cutting a workpiece in open air, wherein the open air plasma cutting system includes a plasma arc torch;
initiating a flow of plasma gas to the plasma arc torch;
initiating a flow of molten metal clearing gas to the plasma arc torch; and
automatically stopping the flow of molten metal clearing gas to the plasma arc torch upon determining a completion of a piercing operation while controlling the flow of plasma gas to the plasma arc torch.

20. The plasma cutting method of claim 19, further comprising the step of injecting an additive into the flow of molten metal clearing gas, wherein the additive is configured to reduce surface tension of a molten puddle created during the piercing operation.

21. The plasma cutting method of claim 20, wherein the additive is an anti-spatter liquid.

22. The plasma cutting method of claim 19, further comprising the step of performing a cutting operation on the workpiece subsequent to the completion of the piercing operation.

23. The plasma cutting method of claim 22, wherein the cutting operation includes cutting a circular hole through the workpiece encircling all top spatter created during the piercing operation, and wherein a diameter of the circular hole is equal to or less than a thickness of the workpiece.

24. The plasma cutting method of claim 19, wherein the open air plasma cutting system includes a plasma cutting power supply that supplies a plasma cutting current to the plasma arc torch, and a gas controller configured to control the flow of plasma gas and the flow of molten metal clearing gas to the plasma arc torch, and at least one of the plasma cutting power supply and the gas controller determines the completion of the piercing operation.

* * * * *